United States Patent [19]

Subramaniam et al.

[11] Patent Number: 5,645,876
[45] Date of Patent: Jul. 8, 1997

[54] DEHYDRATED VEGETABLES AND METHOD FOR THEIR PREPARATION

[75] Inventors: Persis Jebakumari Subramaniam, Surrey, United Kingdom; Sylvia Anna Jones, London, England; Iain Cunningham Mutter Dea, Surrey, United Kingdom

[73] Assignee: CPC International Inc., Englewood Cliffs, N.J.

[21] Appl. No.: 656,596

[22] Filed: May 31, 1996

Related U.S. Application Data

[63] Continuation of Ser. No. 359,173, Dec. 19, 1994, abandoned.

[30] Foreign Application Priority Data

Jan. 14, 1994 [GB] United Kingdom ............... 9400603

[51] Int. Cl.⁶ ..................... A23B 7/02; A23L 1/0524
[52] U.S. Cl. ..................... 426/50; 426/639; 426/640
[58] Field of Search ..................... 426/50, 639, 640

[56] References Cited

U.S. PATENT DOCUMENTS

| | | | |
|---|---|---|---|
| 2,534,263 | 12/1950 | Hills | 426/50 |
| 3,904,774 | 9/1975 | Dymsza | 426/321 |
| 4,330,946 | 5/1982 | Courneya | 34/1 |
| 4,361,589 | 11/1982 | Wauters et al. | 426/270 |
| 4,418,083 | 11/1983 | McKinney et al. | 426/242 |
| 4,542,033 | 9/1985 | Agarwala | 426/321 |
| 4,622,757 | 11/1986 | Bernstein et al. | 34/1 |
| 4,640,020 | 2/1987 | Wear et al. | 34/1 |
| 4,664,924 | 5/1987 | Sugisawa et al. | 426/242 |
| 4,746,968 | 5/1988 | Wear et al. | 219/10.55 |
| 4,889,730 | 12/1989 | Roberts | 426/639 |
| 5,000,972 | 3/1991 | Nafisi-Movaghar | 426/333 |
| 5,020,237 | 6/1991 | Gross et al. | 34/1 |
| 5,053,232 | 10/1991 | Balestrieri et al. | 426/49 |
| 5,113,597 | 5/1992 | Sylla | 34/22 |
| 5,135,122 | 8/1992 | Gross et al. | 219/10.55 |
| 5,380,189 | 1/1995 | Clary et al. | 426/438 |

FOREIGN PATENT DOCUMENTS

| | | |
|---|---|---|
| 0221489 | 10/1986 | European Pat. Off. . |
| 0337621 | 3/1988 | European Pat. Off. . |
| 0404543 | 6/1989 | European Pat. Off. . |
| 0413071 | 8/1989 | European Pat. Off. . |
| 0407299 | 7/1990 | European Pat. Off. . |
| 407299 | 1/1991 | European Pat. Off. . |
| 413071 | 2/1991 | European Pat. Off. . |
| 0546350 | 11/1992 | European Pat. Off. . |
| 546350 | 6/1993 | European Pat. Off. . |
| 2182234 | 4/1973 | France . |
| 2182234 | 7/1973 | France . |
| 2713935 | 10/1977 | Germany . |
| 1067967 | 4/1965 | United Kingdom . |
| 1579392 | 3/1976 | United Kingdom . |

OTHER PUBLICATIONS

MIVAC, A Natural Food De–Hydration Process, Pitt–DesMoines, Inc. Sales Literature.

MIVAC, Dried Foods Technology, Pitt–DesMoines, Inc. Sales Brochure.

Microwave/Vacuum Convective Drying of Foodstuffs, by A. Heindl, W. Holley, D. Rehmann, Munich, pp. 1–14.

*Primary Examiner*—Helen Pratt

[57] ABSTRACT

Dehydrated vegetables are prepared by preparing the vegetables, holding them for a time and at a temperature to activate the endogenous pectinmethylesterase, blanching and drying.

17 Claims, No Drawings

DEHYDRATED VEGETABLES AND METHOD FOR THEIR PREPARATION

This Application is a Continuation of U.S. Ser. No. 08/359,173, filed Dec. 19, 1994 now abandoned.

BACKGROUND OF THE INVENTION

1. Field of Invention

This invention relates to dehydrated vegetables, to methods for their production and to comestible products containing dehydrated vegetables.

2. Description of Related Art

Dehydrated vegetables are used widely in products such as soups and other processed foods often in dehydrated, diced form. The major problem associated with dehydrated vegetables is that on rehydration they often remain collapsed and shrunk giving rise to a product of poor texture relative to the textural quality of the fresh or minimally processed vegetables. The irreversible shrinkage that occurs during drying is due to the collapse of the cell-wall structure.

Pectin is a major component of vegetable cell walls and as such makes a major contribution to the structural integrity and strength of vegetables and vegetable pieces. Native pectin is, generally, high methoxyl in structure and, as a result, is susceptible to degradation on heating under neutral pH conditions. This form of degradation occurs during cooking and is the major reason for unwanted textural softening of vegetables on heat processing. During forced-air drying of vegetable pieces, water is removed, thus releasing the turgor pressure and causing the cell wall structure to collapse. The collapse can be irreversible, if the moisture content of the materials is very high or if the cell wall structure is weak. In these cases, rehydration only causes the absorption of water into the intercellular spaces, thus leading to poor rehydratability of the dehydrated material and poor texture on rehydration.

Vegetables contain pectinmethylesterase (PME) in their cell walls. This endogenous enzyme can be activated by mild heat treatment under specific conditions of pH and ionic strength and, when activated, leads to demethoxylation of the native pectin. The resulting demethoxylated pectin has a structure that is more stable against degradation on heating at neutral pH and that more effectively cross-links in the presence of calcium ions. Both of these factors lead to the strengthening of the cell wall structure and pretreatments that activate the PME enzyme in vegetables have been shown to give improved texture after freezing and canning.

EP-A-0337621 discloses a method for producing dried fruit which involves stabilizing the color and flavor of the fruit by infusing it in a 10 to 70% carbohydrate solution prior to drying.

EP-A-0404543 also describes a process for preparing dried fruit which includes infusion in an aqueous carbohydrate solution. This document teaches that the fruit must be soaked under conditions which deactivate the enzymes and also soften the fruit before deaeration is carried out.

The present invention relates to the production of dehydrated vegetables which have improved textural qualities on rehydration. It has been found that improved texture in the rehydrated product may be achieved by preservation of the cell wall structure of vegetables on dehydration by activating the endogenous pectinmethylesterase enzyme.

According to the present invention, there is provided a method for producing dehydrated vegetables comprising preparing the vegetables, holding the prepared vegetables for a time and at a temperature to activate endogenous pectinmethylesterase, blanching and drying.

Preferably, the method of the invention comprises infusing the prepared vegetables before, during or after the holding treatment in an aqueous solution comprising from 20 to 70% of one or more carbohydrates and, optionally, up to 5.0% of a calcium salt.

Plant material such as vegetables containing pectinmethylesterase may be used in the invention and, particularly, include carrot, tomato, celery and bell pepper. Activation of the endogenous pectinmethylesterase is preferably carried out by holding the vegetable matter under specific pH conditions at an elevated temperature. The pH conditions, the temperature range and the time for which the material is held in that range to effect activation varies with the vegetable used and the optimum conditions required in each specific case may be determined if the optimal conditions to promote PME activity in the vegetable is known. The conditions and/or the methods for their determination will be well-known to those skilled in the art. Generally, the vegetable pieces are held in water or an aqueous solution at a pH of from 6 to 8 at a temperature of from 45° to 70° C. for from 10 to 60 minutes. For carrot, bell pepper, celery and tomato, the optimum conditions are about 60° C. for 40 minutes, about 60° for 30 minutes, about 60° C. for 15 minutes and about 50° C. for 15 minutes, respectively.

The vegetables used in the present invention may be the whole or any part of the whole vegetable and are prepared in conventional ways well-known in the art. The vegetables may be treated by cutting to any given size as required by their end use. Preferably, the vegetables are diced and have dimensions of from 0.5 to 1.5 mm. Typically, the vegetables may be prepared by washing, peeling and dicing the fresh vegetables.

In a preferred embodiment of the invention, the vegetables are infused with an aqueous infusion solution comprising from 20 to 70% by weight of one or more carbohydrates and, optionally, up to 5.0% by weight of a calcium salt (e.g., from 0.5% to 5.0%). The infusion may be carried out before, during or after the holding treatment but is preferably carried out either after the holding treatment or during the holding treatment by carrying out the holding treatment in the infusion solution. The infusion treatment causes osmotic dehydration and, therefore, aids drying. The carbohydrates are preferably monosaccharides or disaccharides since it is preferred that they have a relatively low molecular weight to permit ready infusion into the vegetable tissue. The most preferred carbohydrates are glucose, sucrose, fructose and mixtures thereof. Any edible calcium salt having a sufficiently high solubility to provide a 0.5 to 5.0% solution of the salt in the infusion solution may be used in the invention. Suitable salts include calcium chloride, calcium lactate and mixtures thereof. The infusion solution may include other substances, such as sodium chloride (up to 10%) that promote osmotic dehydration, and other flavorants or preservatives that do not affect the performance of the invention.

The infusion of the vegetables may take place at ambient pressure but is preferably carried out under vacuum. Vacuum infusion methods of the type used in the invention are well-known to those skilled in the art. Preferably, vacuum infusion is carried out by subjecting the vegetable matter in the infusion solution to a vacuum of from 2.67 to 5.33 MPa (20 to 40 mmHg) for a period of from 1 to 10 minutes. A typical vacuum infusion process involves holding the vegetable matter in the infusion solution, applying a vacuum of 20 mmHg for 5 minutes, slowly releasing the vacuum and holding for a further 5 minutes.

Blanching of the treated vegetable matter may be carried out by the standard commercial treatments which are used prior to dehydration in order to deactivate enzymes that are known to cause deterioration in the quality of the dried products. Suitable blanching treatments include immersion of the vegetable matter in water or an aqueous solution (e.g., a dilute sodium bicarbonate solution) at about 100° C. for from 1 to 5 minutes. Preferably, blanching is carried out in the infusion solution. The skilled person will be aware of the blanching conditions which are suitable in any given case.

Drying of the blanched material may be carried out by conventional methods such as vacuum drying or forced air drying. The treated vegetables may, for example, be dried by forced air drying at a temperature of from 75° to 95° C. with an air velocity of 3 m/s.

The present invention will now be described with reference to the following examples.

EXAMPLES

Example 1

Raw carrots were peeled and then cubed to a size of about 10 mm×10 mm×10 mm. The resulting cubed carrot was held at a temperature of 60° C. in a thermostat-controlled water bath for a predetermined length of time. Where the vegetables were subjected to vacuum infusion, this was carried out in a jacketed vessel at a reduced pressure of about 20 mmHg for about 5 minutes followed by a slow return to atmospheric pressure and holding in the solution for 5 minutes. Blanching of the treated vegetables was carried out using conditions similar to those of standard commercial treatments (1000° C. for 4 minutes in water). Drying was carried out by forced air drying at about 930° C. with an air velocity of 3 m/s. The moisture level of the samples was determined by monitoring the loss in weight and drying was terminated when a moisture level of approximately 4% was obtained.

Product assessment—Dehydrated products were assessed for rehydration and textural characteristics.

Moisture determination—The actual moisture content of the dried pieces was measured by drying 5 g of the samples to constant weight in a vacuum oven at 70° C.

Rehydration characteristics—To assess the performance of dehydrated pieces in finished products, the samples were rehydrated in boiling water. 50 ml of boiling water was added to 5 g of the sample and left for 5 minutes. The pieces were then strained and weighed to determine the rehydration ratio which is the ratio of the weight of the reconstituted sample to that of the dry sample.

Organoleptic assessment—All samples were informally assessed for organoleptic quality by a few experienced assessors, who examined the pieces for color, texture and flavor. The results are shown in Table 1.

TABLE 1

FORMATION OF DEHYDRATED CARROT BY THE PRESENT INVENTION

| Pretreatment | Drying time (h) | Rehydration ratio | Shrinkage on rehydration | Organoleptic quality |
| --- | --- | --- | --- | --- |
| 60° C./40 min then infusion of 1% calcium lactate + 60% glucose | 3.80 | 1.46 | Very slightly shrunk 7–9 mm × 7 mm × 7 mm | Crunchy; sweet soft outside and a hard crisp center |
| 60° C./40 min in 60% sucrose + 10% NaCl | 2.50 | 2.03 | Very slightly shrunk 9–7 mm × 7–5 mm × 7–8 mm | Crunchy; slightly crispy; good flavor but salty |
| 60° C./40 min in 60% sucrose | 2.50 | 2.07 | Quite shrunk 8–9 mm × 8–5 mm × 10–5 mm | Crunch with hard core; sweet; slight loss of color; quite good flavor |

Example 2

The method described in EXAMPLE 1 was applied to the production of dehydrated celery. Celery pieces were produced by cutting fresh celery lengthwise into 10 mm wide strips and then slicing into 10 mm segments. The thinner, greener part of the celery stalk was used in preference to the wider, whiter part in order to obtain appropriately sized pieces.

Pretreatments were carried out at 60° C. and blanching in 0.5% sodium bicarbonate solution. The results are given in Table 2.

TABLE 2

FORMATION OF DEHYDRATED CELERY BY THE PRESENT INVENTION

| Pretreatment | Drying time (h) | Moisture content (%) | Rehydration ratio | Shrinkage on rehydration | Organoleptic quality |
| --- | --- | --- | --- | --- | --- |
| 10% NaCl + 60% sucrose vacuum infusion 60° C./15 min + blanch in same | 8.00 | 0.58 | 1.36 | Slightly shrunk; no collapse 9–10 mm | Bright color; some celery odor; very crunchy, like raw, very salty |
| 10 NaCl 60% | 8.00 | 0.77 | 1.77 | As above 9–10 mm | Some typical |

TABLE 2-continued

FORMATION OF DEHYDRATED CELERY BY THE PRESENT INVENTION

| Pretreatment | Drying time (h) | Moisture content (%) | Rehydration ratio | Shrinkage on rehydration | Organoleptic quality |
|---|---|---|---|---|---|
| sucrose 60° C./15 min + blanch in same | | | | | aroma; crunchy; more flesh; salty |

Example 3

The method of EXAMPLE 1 was applied to the production of dehydrated tomato from 10 mm×10 mm×10 mm tomato pieces obtained by cutting the tomato in half, removing the seeds and dicing the resulting "shells".

Pretreatments were carried out at 50° C. and the treated vegetable blanched in water at 100° C. for 1 minute. The results are presented in Table 3.

TABLE 3

FORMATION OF DEHYDRATED TOMATO BY METHOD OF THE PRESENT INVENTION

| Pretreatment | Drying time (h) | Rehydration ratio | Shrinkage on rehydration | Organoleptic quality |
|---|---|---|---|---|
| 50° C./15 min in 60% sucrose | 11.25 | 1.90 | Flesh intact | Soft flesh; crispy center; sweet; good flavor |
| Vacuum infuse 60% sucrose + 2% CaCl₂ and hold (50° C./15 min) | 19.00 | 1.17 | Slightly shrunk | Soft outer; slight crisp center; flavor quite sweet; good flesh |
| Vacuum infuse 60% glucose + 2% CaCl₂ and hold (50° C./15 min) | 19.00 | 1.13 | Slightly shrunk | Bright color; flesh as in fresh; crisp center; sweet but salty |
| 50°/15 min in 60% sucrose + 10% NaCl | 11.25 | 1.61 | Flesh intact | Very birght color; slight crisp center; good flavor; salty; flesh similar to fresh |

Example 4

The method of EXAMPLE 1 was applied to the production of dehydrated bell pepper (CAPSICUM ANNUM L.) from 10 mm×10 mm pepper pieces obtained by cutting the pepper in half, removing the seeds and then cutting the resulting "shells" into squares.

Pretreatments were carried out at 60° C. and the treated vegetable blanched in either water or test solution at 100° C. for 2 minutes. The result are presented in Table 4.

TABLE 4

FORMATION OF DEHYDRATED BELL PEPPER BY THE PRESENT INVENTION

| Pretreatment | Drying Time (h) | Rehydration ratio | Shrinkage on rehydration | Organoleptic quality |
|---|---|---|---|---|
| 60° C./30 min in a 30% sucrose/ 4% NaCl followed by vacuum infusion and blanching in the same solution | 7 | 1.9 | Quite fleshy | Mild peppery odor; crunchy texture; sweet; good flavor |
| 60° C./30 min in 2% calcium lactate followed by infusion of 30% sucrose/4% NaCl then blanching in the same solution | 7 | 1.9 | Slightly fleshy | Mild peppery firm texture; salty flavor |

Example 5

Dehydrated carrot and bell pepper prepared by the method of the present invention were rehydrated by the following methods:

a) soaking in boiling water for 5 minutes;
b) microwaving in water for 2 minutes at full power; and
c) soaking in cold water for 2, 4 and 22 hours.

The carrot samples used in this example were as follows:

1. standard blanched carrot (100° C./4 minutes) without pretreatment—used as a control;
2. 60° C./40 minutes in deionized water, vacuum infusion of 1% calcium lactate/60% glucose and blanch in same;
3. 60° C./40 minutes in deionized water, blanch in deionized water, vacuum infusion of 1% calcium lactate/60% glucose;
4. 60° C./40 minutes in 60% sucrose/10% sodium chloride and blanch in same.

The results of the tests are given in Tables 5, 6 and 7. The pepper samples used in this example were as follows:

1. Control, standard blanch 2 minutes at 100° C. in deionized water.
2. Holding at 60° C. for 3 minutes in deionized water, then blanching as the control.
3. Holding at 60° C. for 30 minutes in 30% sucrose/4% NaCl solution, followed by vacuum infusing for 10 minutes, then blanching in the same way as the control.
4. Holding at 60° C. for 30 minutes in 30% sucrose/4% NaCl solution, followed by vacuum infusing for 10 minutes, then blanching in the same way as the control.
5. Holding at 60° C. for 30 minutes in 2% calcium lactate solution, followed by vacuum infusing for 10 minutes in 30% sucrose/4% NaCl solution, then blanching in 30% sucrose 4% NaCl solution, as the control.

The result of the tests involving pepper are given in Tables 8, 9 and 10.

TABLE 5

REHYDRATION OF CARROT SAMPLES WITH BOILING WATER

| Sample No. | 1 | 2 | 3 | 4 |
|---|---|---|---|---|
| Rehydration (RR) | 1.87 | 1.57 | 1.58 | 1.45 |
| Dimensions after rehydration (mm) | 5 × 6 × 5<br>5 × 6 × 5<br>7 × 6 × 6 | 7 × 7 × 7<br>7 × 6 × 5<br>8 × 6 × 6 | 7 × 7 × 7<br>7 × 5 × 5<br>7 × 6 × 5 | 7 × 6 × 6<br>6 × 10 × 6<br>9 × 7 × 6 |
| Shrinkage on rehydration | Quite shrunk & collapsed | Slightly collapsed & shrunk | Very slightly more shrunk than 2 | Best so far; hardly any shrinkage |
| Odor | Carroty | Not much odor | Not much odor | Not much odor |
| Color | Orange; bright | Orange; bright slightly less color than 1 | Dark color | Orange; slightly duller than 1 |
| Texture | Slight crunch, but quite soft | Very crunchy; slightly hard center; like fresh | Crunchy; but not as crunchy as 2; not fully hydrated; hard center | Softer than 2 & 3, but crunchier than 1; hard center |
| Flavor | Only a slight carrot flavor | More flavor than 1, but still quite bland | Same as for 2 except sweet | Too salty; carroty |

TABLE 6

REHYDRATION OF CARROT SAMPLES IN THE MICROWAVE

| Sample No. | 1 | 2 | 3 | 4 |
|---|---|---|---|---|
| Rehydration ratio (RR) | 1.83 | 1.48 | 1.48 | 1.43 |
| Dimensions after rehydration (mm) | 5 × 5 × 6<br>5 × 5 × 6<br>7 × 6 × 6 | 5 × 6 × 6<br>4 × 6 × 6<br>5 × 5 × 5 | 7 × 6 × 5<br>7 × 5 × 5<br>7 × 5 × 5 | 8 × 6 × 6<br>7 × 6 × 6<br>8 × 6 × 6 |
| Shrinkage on rehydration | Shrinkage worse than with boiling water rehydration | Similar to boiling water rehydration | Similar to boiling water rehydration | Similar to boiling water rehydration |
| Odor | Similar to boiling water rehydrated products | | | |
| Texture | Drier than boiling water rehydrated samples; soft; rubbery | Very crunchy; hard center; not as rehydrated as boiling water samples | Slightly crunchy; quite hard center; not as rehydrated as boiling water | Soft outer and hard center |

TABLE 6-continued

REHYDRATION OF CARROT SAMPLES IN THE MICROWAVE

| Sample No. | 1 | 2 | 3 | 4 |
|---|---|---|---|---|
| Flavor | Bland; slight carrot flavor | Strong carrot flavor | samples Some carrot flavor present | Not as salty as rehydrating in boiling water good carrot flavor |

TABLE 7

REHYDRATION OF CARROT PIECES IN COLD WATER

| | | Soaking time (h) | | |
|---|---|---|---|---|
| | Sample No. | 2 | 4 | 22 |
| Rehydration ratio (RR) | 1 | 2.94 | 3.38 | 4.09 |
| | 2 | 2.47 | 2.98 | 3.27 |
| | 3 | 2.34 | 2.85 | 3.24 |
| | 4 | 2.15 | 2.59 | 2.85 |
| Shrinkage on rehydration | 1 | Slightly shrunk | Very slightly shrunk | Very slightly shrunk |
| | 2 | No shrinkage | No shrinkage | No shrinkage |
| | 3 | Slightly shrunk | No Shrinkage | No shrinkage |
| | 4 | No shrinkage | No shrinkage | No shrinkage |
| Texture | 1 | — | — | Slightly soft; slight crunch |
| | 2 | — | — | Like raw carrot |
| | 3 | — | — | Quite crunchy |
| | 4 | — | — | Slightly crunchy but slightly soft |
| Flavor | 1 | — | — | Good carrot flavor |
| | 2 | — | — | Slight carrot flavor; slightly sweet |
| | 3 | — | — | Quite crunchy; sweet |
| | 4 | — | — | Salty; slight carrot flavor |

TABLE 8

REHYDRATION OF PEPPER SAMPLES WITH BOILED WATER

| Sample No. | 1 | 2 | 3 | 4 | 5 |
|---|---|---|---|---|---|
| Rehydration ratio | 2.9 | 3.2 | 1.7 | 1.9 | 1.9 |
| Shrinkage on rehydration | Shrunk | Shrunk | Fleshy | Most fleshy | Slightly fleshy |
| Odor | Hay-like; peppery | Grass | Slightly peppery | Mild; peppery | Mild; peppery |
| Color | Dark green | Dark green | Green | Lighter | Green |
| Texture | Slimy | Skin/ tough | Firm | Crunchy | Firm |
| Flavor | Bitter peppery | Bitter | Salty | Sweet; best flavor | Salty |

TABLE 9

REHYDRATION OF PEPPER SAMPLES IN THE MICROWAVE

| Sample No. | 1 | 2 | 3 | 4 | 5 |
|---|---|---|---|---|---|
| Rehydration ratio | 3.2 | 3.4 | 1.9 | 2.1 | 1.9 |
| Shrinkage on rehydration | Quite shrunk | Very shrunk | Shrunk | Least shrunk | Shrunk |
| Odor | Dried grass | Hay-like | All 3 samples were mildly peppery | | |
| Color | Olive/brown | Olive | Olive | Bright green | Light green |
| Texture | Soft | Skin/tough | Crunchy | Most crunchy | Firm |
| Flavor | Bitter; mild | Cabbage; bitter | Sweet; mild pleasant | Too salty | Salty; no pepper flavor |

TABLE 10

REHYDRATION OF PEPPER SAMPLES IN COLD WATER

| Sample No. | 1 | 2 | 3 | 4 | 5 |
|---|---|---|---|---|---|
| Rehydration ratio after various soaking times | | | | | |
| 2 h | 5.0 | 5.3 | 2.8 | 3.3 | 2.8 |
| 4 h | 5.7 | 6.1 | 3.3 | 3.8 | 3.4 |
| 22 h | 7.0 | 7.6 | 4.4 | 4.8 | 4.1 |
| Shrinkage on rehydration | Slightly shrunk | Shrunk | Fleshy | As raw | Slightly fleshy |
| Odor | Hay-like | Green grass | Pepper-like | Peppery | Some peppery |
| Color | Dark green | Dark green | Pale/bright green | Bright green | Green |
| Texture | Soft | Skin | Crunchy | Very crunchy; as raw | Crunchy |
| Flavor | No flavor | Very little flavor | Sweet, slightly peppery; watery | Best; peppery | Salt; water; slightly peppery |

The samples infused with glucose/calcium, before blanching, showed a lower amount of shrinkage than the samples infused after blanching, when rehydrated in boiling water (Table 5). The pieces held in sucrose/salt solution showed the least amount of shrinkage, but were slightly softer in texture compared with the glucose-infused samples. The samples infused with glucose solution after blanching were found to be too sweet and samples treated with sucrose/salt were too salty but had good carrot flavor. Soaking in boiling water for 5 minutes was not adequate to rehydrate any of the treated samples completely.

Rehydration of dried carrot pieces in the microwave was not as successful as in boiling water. The rehydration ratios of samples were lower when the microwave method was used. All the rehydrated products were drier in texture but only the control samples developed a rubbery texture.

Rehydration in cold water was investigated to determine whether dried samples could be rehydrated without heating in wet products. Although the samples soaked for 2 and 4 hours were not tasted, the rehydration results indicated that 2 hours would be adequate to rehydrate the dried pieces completely. After soaking for 2 hours, the pretreated samples showed little or no shrinkage, the samples from pretreatment 2 and 4 having a swollen appearance. After 22 hours no shrinkage was seen on any of the pretreated samples. On tasting, the samples infused with glucose/calcium (pretreatment 2) were said to be the best, with a raw carrot-like texture. The samples treated in sucrose/salt were slightly soft.

Example 6

Dehydrated carrot samples prepared by the method of the present invention and a control sample were tested for their rehydration properties in instant and simmered dried soup products.

In the instant soup (Knorr® low-calorie chicken noodle soup), the samples were assessed by adding approximately 3 g of dried pieces to the dried soup (about 10 g) and then rehydrating with 90 ml of boiling water and stirring.

Dried samples were assessed in the simmered soup (Knorr® cream of chicken soup) by preparing the soup according to the manufacturer's instructions, and the rehydrated pieces assessed for size and texture. The samples were prepared by adding approximately 5 g of dried pieces to 22.7 g of the dry soup, then 283 ml of cold water, bringing the mixture to boil and simmering for 5 minutes. The results are presented in Table 11.

TABLE 11

ASSESSMENT OF CARROT SAMPLES IN SOUPS

| Pretreatment | Simmered soup | Instant soup | |
|---|---|---|---|
| | | Assessed instantly | Assessed after 5 mins |
| Control | Carrot soft but not soggy; good carrot flavor | Carroty taste slightly soft; crunchy | Softer than 2; slightly hard center |
| 60° C./40 min then infusion of 1% calcium lactate + 60% glucose | Very crunchy; no hard center; good flavor, especially the aftertaste | Crunchy especially in center; quite carroty taste | Very crunchy good carrot flavor |
| 60° C./40 min in 60% sucrose | Outside of pieces very soft but hard centers; softer than 2; did not taste too salty | Not fully hydrated; hard center; soft outside | Not fully hydrated; hard center; soft outside |

The pretreated samples did not hydrate completely in the instant soup after 5 minutes. Both pretreated samples had a firmer texture than the control samples but holding at 60° C. combined with infusion of glucose/calcium gave the best result.

When assessed in the simmered soup, the control and samples held at 60° C. and then infused with glucose/calcium (pretreatment 2) had hydrated completely and the latter had a very crunchy texture and good flavor. The sample treated in sucrose/NaCl did not hydrate adequately and had a softer texture.

What is claimed is:

1. A method for producing dehydrated vegetables comprising preparing the vegetables, holding the prepared vegetables for a time and at a temperature to activate endogenous pectinmethylesterase, blanching and drying, wherein the prepared vegetables are held at from 45° to 70° C. for from 10 to 60 minutes.

2. A method as claimed in claim 1 further comprising infusing the prepared vegetables before, during or after the holding treatment in an aqueous infusion solution comprising from 20 to 70% of one or more carbohydrates.

3. A method as claimed in claim 2 wherein the infusion solution contains up to 5.0% of a calcium salt.

4. A method as claimed in claim 3 wherein the infusion solution comprises up to 10% sodium chloride.

5. A method as claimed in claim 3 wherein the carbohydrates are selected from the group consisting of glucose, sucrose and fructose.

6. A method as claimed in claim 3 wherein the calcium salt is calcium chloride, calcium lactate or mixtures thereof.

7. A method as claimed in claim 2 wherein the infusion solution comprises up to 10% sodium chloride.

8. A method as claimed in claim 7 wherein the carbohydrates are selected from the group consisting of glucose, sucrose and fructose.

9. A method as claimed in claim 2 wherein the carbohydrates are selected from the group consisting of glucose, sucrose and fructose.

10. A method as claimed in claim 2 wherein the holding treatment is carried out in the aqueous solution to effect, at least partially, the infusion of the prepared vegetables.

11. A method as claimed in claim 10 wherein the infusion is carried out before or after the holding treatment by vacuum infusion.

12. A method as claimed in claim 11 wherein the vegetables are subjected to a vacuum of from 20 to 40 mmHg for from 1 to 10 minutes.

13. A method as claimed in claim 2 wherein the holding treatment is carried out in water and is followed by the infusion step.

14. The method as claimed in claim 1 wherein the vegetable is selected from the group consisting of carrot, celery, bell pepper and tomato.

15. Dehydrated vegetable matter obtainable by the method of claim 1.

16. A dried food product reconstitutable with aqueous liquids comprising the dehydrated vegetable matter of claim 15.

17. A comestible product comprising the dehydrated vegetable matter of claim 15 in rehydrated form.

* * * * *